(No Model.) 2 Sheets—Sheet 1.
H. A. MOYER.
HUB BORING MACHINE.
No. 260,774. Patented July 11, 1882.
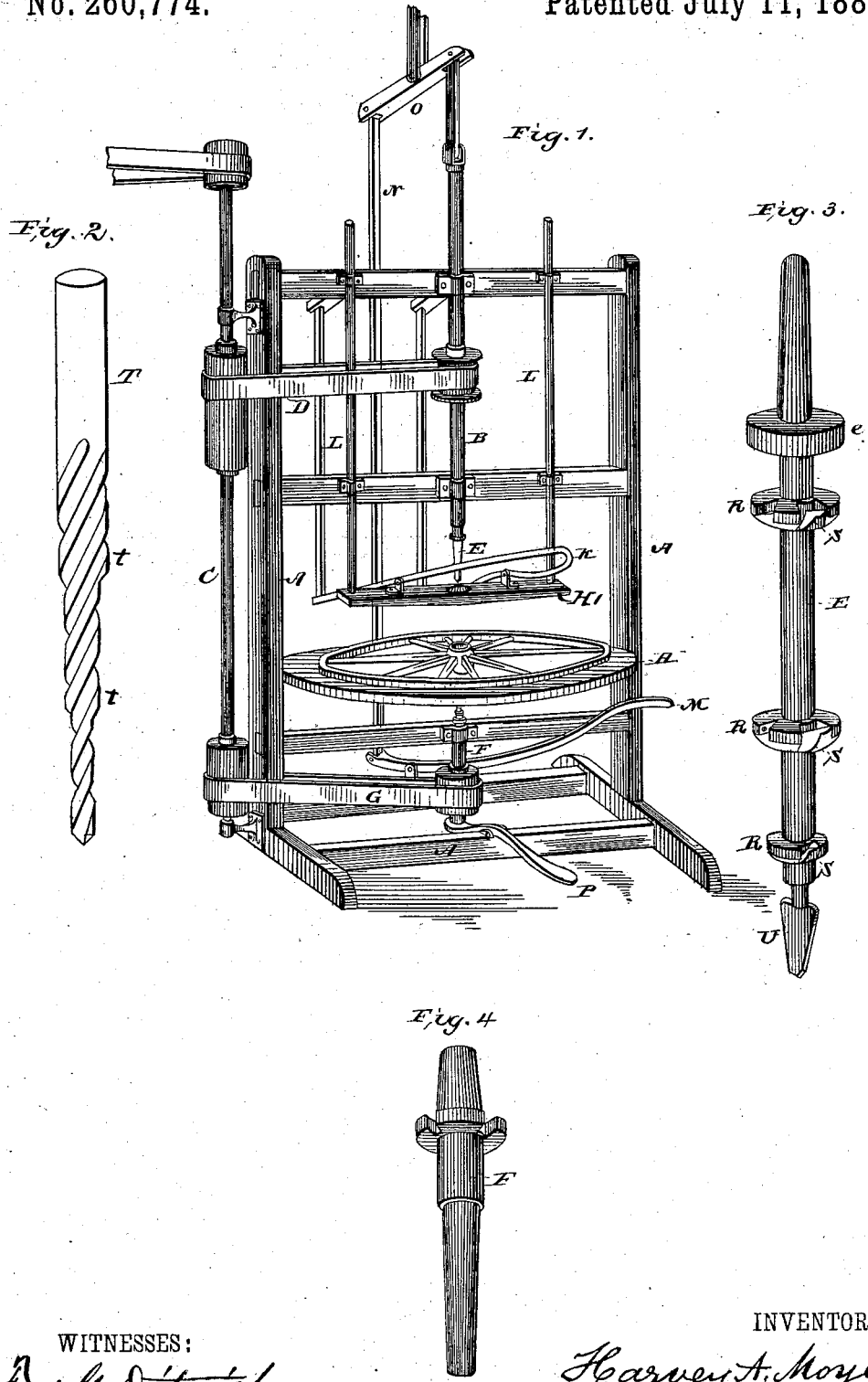
WITNESSES:
Fred G. Dieterich
A. M. Long
INVENTOR.
Harvey A. Moyer
By Daniel Breed ATTORNEYS.

(No Model.) 2 Sheets—Sheet 2.

H. A. MOYER.
HUB BORING MACHINE.

No. 260,774. Patented July 11, 1882.

WITNESSES:
Fred. G. Dieterich.
A. M. Long

INVENTOR.
Harvey A. Moyer
By Daniel Breed, ATTORNEYS.

UNITED STATES PATENT OFFICE.

HARVEY A. MOYER, OF SYRACUSE, NEW YORK.

HUB-BORING MACHINE.

SPECIFICATION forming part of Letters Patent No. 260,774, dated July 11, 1882.

Application filed April 11, 1882. (No model.)

*To all whom it may concern:*

Be it known that I, HARVEY A. MOYER, a citizen of the United States, residing at Syracuse, in the county of Onondaga and State of New York, have invented certain new and useful Improvements in Machines for Boring Hubs, of which the following is a specification, reference being had therein to the accompanying drawings.

My invention consists in certain improvements in machines for boring carriage-hubs for the iron box, which will be fully understood by the following description and claims.

Figure 5:
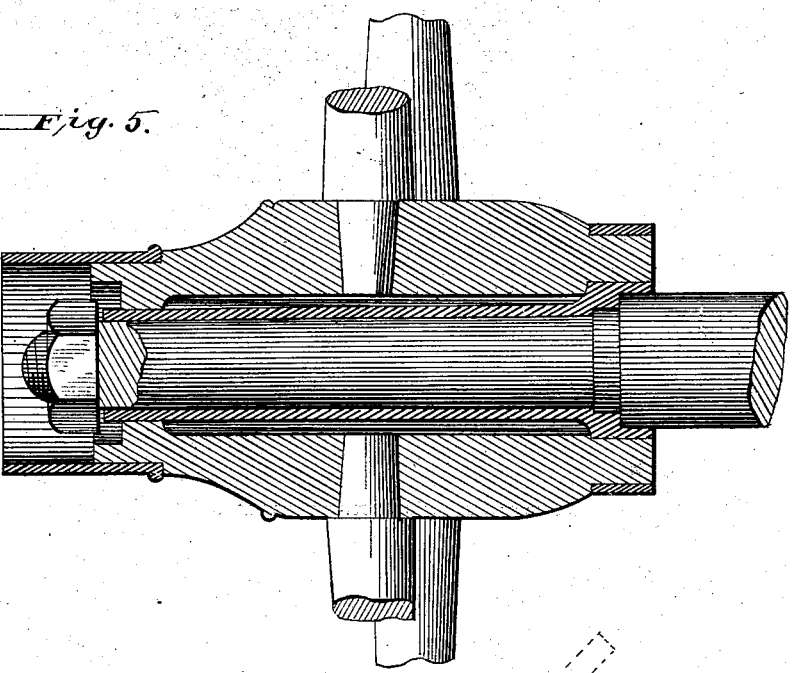
Figure 6:
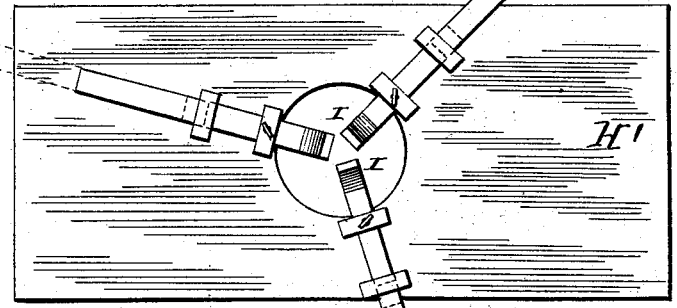
Figure 7:
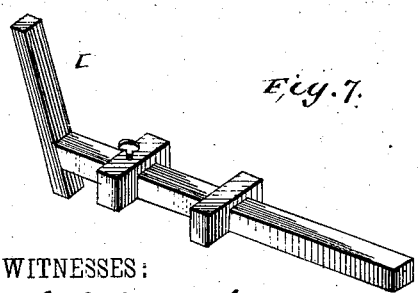

In the accompanying drawings, Figure 1 is perspective view of my machine. Figs. 2, 3, and 4 are detached views of the tools for boring. Fig. 5 is a section of the hub with box and spindle in place. Fig. 6 is a top view of the centering and clamping jaws. Fig. 7 is a detached view of a jaw.

Upon a suitable frame, A, is mounted a vertical shaft, B, which receives motion from the power-shaft C by means of band D, and carries the spindle E, with its several different-sized boring devices, which will be hereinafter explained. Another vertical shaft, F, receiving motion from the same power-shaft and the band G, is employed to bore the front of the hub and make the countersink for the nut.

Upon a horizontal plate or frame, H, the wheel is supported for boring, the centering and clamping jaws or funnel-shaped set-ring I being brought down like a chuck-ring to seize and center and hold the hub in place while it is bored. These clamping-jaws are adjustable to fit different-sized hubs, as shown in Figs. 6 and 7, and they are attached to under side of plate H, which is raised and lowered by means of lever K and sliding rods L, as seen in Fig. 1.

A hand-lever, M, push-rod N, and pivoted lever O are employed to regulate the feed in boring the hub, and a treadle-lever, P, in like manner regulates the feed of the lower shaft or spindle, F.

The spindle E, Fig. 3, is provided with an adjustable collar, e, for stopping the feed and preventing the tools from cutting too far. The lower end of this spindle carries a tapering reamer, U, with drill-point and four cutting-edges, as shown. A series of different-sized collars, R, are employed to gage the feed of the curved knife S, which is inserted through the spindle E and made adjustable, so as to cut any desired thickness of chip, like a carpenter's plane. A similar knife in the collar on the lower spindle, F, is used to cut the countersink in the front end of the hub in order to receive the nut.

As a modification of the series of knives on spindle E, and for the purpose of boring small hubs, I use a new bit, T, Fig. 2, having a series of shoulders, *t*, thus boring different-sized holes with the same bit.

At both ends of the hub the box fits the hole, as seen in Fig. 5; but the hole opposite the ends of the spokes is bored larger than the box, in order to leave a free space opposite the ends of the spokes, and thus prevent the spokes from resting on the box, which is liable to break the box, especially in tightening the tire on old wheels.

The above-described series of knives and collars on spindle E, arranged to bore a series of holes of different sizes, operate like the tapering bit T, and both may be called "cone" bits or tools.

The chief advantages of my machine are the ease and accuracy of centering the hub for boring the same, and the speed with which the holes are bored for the boxes.

Having described my invention, what I claim is—

1. In a hub-boring machine, the bed-plate H and upward-acting drill F, in combination with the vertically and laterally adjustable centering-clamps I, the plate H', slide-rods L, and lever K, the tapering downward-acting drill, and driving mechanism, substantially as shown and described.

2. In a hub-boring machine, the vertical downward-acting drill, provided with the flat tapering point U and one or more adjustable bits, R S, and the collar *e*, in combination with the pivoted upward-acting drill F and foot-lever P, hand-lever M, rod N, and swinging lever O, frame A, bed-plate H, and the driving mechanism, as shown and described.

3. In a hub-boring machine, the vertical downward-acting drill, provided with the tapering double-shouldered screw-bit T $r$ $t'$, in combination with the upward-acting pivoted drill F and foot-lever P, hand-lever M, rod N, and swinging lever O, the frame A, bed-plate H, and driving mechanism, substantially as shown and described.

In testimony whereof I affix my signature in presence of two witnesses.

HARVEY A. MOYER.

Witnesses:
DANIEL BREED,
W. H. KNAPP.